United States Patent

[11] 3,576,456

[72] Inventor Frank T. De Wolf
    Erie, Pa.
[21] Appl. No. 4,607
[22] Filed Jan. 21, 1970
[45] Patented Apr. 27, 1971
[73] Assignee General Electric Company

[54] TRANSIENT LEAKAGE FLUX BARRIER FOR DC DYNAMOELECTRIC MACHINES
1 Claim, 5 Drawing Figs.

[52] U.S. Cl. .................................... 310/186, 310/224
[51] Int. Cl. .................................... H02k 23/24
[50] Field of Search .......................... 310/186, 224; 322/64—66; 318/521 (Cursory)

[56] References Cited
UNITED STATES PATENTS

| | | | |
|---|---|---|---|
| 3,201,625 | 8/1965 | Smith | 310/154 |
| 2,709,763 | 5/1955 | Opel | 310/224X |

FOREIGN PATENTS

| | | | |
|---|---|---|---|
| 203,003 | 8/1923 | Great Britain | 310/224 |
| 178,655 | 11/1935 | Sweden | 310/224 |

Primary Examiner—D. X. Sliney
Attorneys—James C. Davis, Jr., Edward W. Geobel, Jr., Frank L. Neuhauser, Oscal B. Waddell and Joseph B. Forman ABSTRACT: The performance and commutating ability of a dynamoelectric machine using commutating poles are improved during transient loading conditions and during pulsations in the power supply of the machine through the use of transient flux barriers which are mounted between the commutating pole piece and the commutating winding of the machine. Because the transient flux barriers are manufactured out of metallic material having a high level of conductance, transient leakage flux from the commutating pole induces eddy currents in the transient flux barrier. As a result, these eddy currents are prevented from being generated in the frame of the machine itself resulting in improved commutation while the current of the machine is undulating. The transient flux barriers have an extension at the end thereof adjacent the armature so as to have a substantially L-shaped cross section, and both the barriers and the commutating coil are positioned as close to the armature as is reasonably possible.

Patented April 27, 1971

INVENTOR.
FRANK T. DE WOLF

BY Edward N. Goebel

HIS ATTORNEY

Patented April 27, 1971 3,576,456

3,576,456

1

TRANSIENT LEAKAGE FLUX BARRIER FOR DC DYNAMOELECTRIC MACHINES

BACKGROUND OF THE INVENTION

This invention relates to DC dynamoelectric machines, and more particularly, to DC dynamoelectric machines which have field assemblies that include commutating poles.

This invention is related to an invention described and claimed in a patent application which is filed concurrently herewith in the name of Mr. James E. Bunner. That U.S. Pat. application, Ser. No. 4,544, which is assigned to the assignee of this invention and is entitled TRANSIENT LEAKAGE FLUX BARRIER is intended to be incorporated herein by reference.

As explained in the aforesaid patent application, many direct-current dynamoelectric machines require commutating poles or interpoles mounted between adjacent main field poles to neutralize reactive voltage produced in rotating armature coils undergoing commutation, that is, in armature coils having the direction of current flow therein changed as these coils are shorted by brushes in the machine. The electromagnetic windings for these commutating poles are effectively connected in series with the armature load circuit to produce a commutating flux essentially proportional to the armature current level and thus proportional to the reactive voltage level of the armature coils undergoing commutation.

As further explained in the above-cited patent application, in an attempt to provide acceptable, sparkless commutation and superior current collection characteristics for DC dynamoelectric machines and eliminate damage to brushes and commutators of these machines, the commutating flux level which is produced by the commutating pole is adjusted to an optimum value for the normal operation of the dynamoelectric machine. However, even when the commutating flux level is adjusted to this optimum value, dynamoelectric machines often exhibit commutating difficulties under certain transient conditions: when the armatures of these machines are energized by voltage supplies having a high ripple content, such as voltage supplies using semiconductor rectifiers to convert AC voltage to DC voltage, and when these machines are subjected to rapidly changing increases and decreases in load. During these transient armature current conditions, it has been observed that the instantaneous commutating flux level lags the change in the armature current level. For example, when power supplies having a high ripple content are used for supplying armature current to the motor, the commutating flux ripple is out of time phase and is of reduced magnitude with respect to the ripple in the armature current. The loss of the desired proportionality between the armature current and the commutating flux and the resulting commutation difficulties are due to the effect of distributed eddy currents in the magnetic path.

SUMMARY OF THE INVENTION

In accordance with the invention of the aforecited patent application filed in the name of Mr. James E. Bunner, it was found that during transient load conditions the load or armature current causes the total flux produced by the commutating fields to attempt to change rapidly. These changes produce eddy currents in the magnet frame of the dynamoelectric machine, which eddy currents tend to oppose the desired change in the level of effective commutating flux produced by the commutating field. As a result, a change in the effective commutating flux is delayed substantially so that the DC dynamoelectric machine exhibits poor commutating characteristics during these transient changes in load current level.

It was explained that the total flux produced by the commutating field comprises: (1) effective flux which passes from the ends of the commutating poles and through the airgap to the armature and (2) leakage flux which passes from the sides of the commutating poles to the main pole structure or directly to the magnet frame of the machine. The amount of leakage flux is commonly several times the effective flux.

2

In accordance with that invention, a transient leakage flux barrier comprising material having a high electric conductivity is mounted between one or more of the commutating poles of a dynamoelectric machine and corresponding adjacent main poles. The flux barrier is placed in the path of leakage transient flux which passes from the sides of the commutating poles. However, this highly conductive flux barrier is not in the path of the effective transient flux which passes from the ends of the commutating poles and through the airgap between the commutating poles and the armature to compensate the reactive voltage of commutation. The transient leakage flux passing through the transient flux barrier produces eddy currents in the flux barrier which inhibit the change of the transient leakage flux. As a result, the eddy currents produced in the magnetic path of the motor are reduced so that the effective transient flux remains more nearly in phase with the armature current and more nearly in proportion with the armature current.

It is an object of this invention to optimize the position of the aforesaid transient leakage flux barriers in the field structure of DC dynamoelectric machines.

It is another object of this invention to optimize the shape of the transient leakage flux barriers used in DC dynamoelectric machines.

Briefly, in accordance with this invention, commutating pole assemblies used in DC dynamoelectric machines include commutating flux barriers mounted between the commutating pole piece and the commutating coil which are normally included in these assemblies. A highly effective commutating flux barrier comprises a sheet of material having a high level of conductance which is in turn mounted between the commutating pole and the commutating coil. The sheet of material should intercept as much as possible of the transient leakage flux passing from the commutating pole piece, thereby causing this intercepted flux to produce eddy currents in the transient flux barrier. In accordance with this invention, a transient flux barrier made out of highly conductive sheet of material having an extension near the armature was found to be highly effective in improving the commutating ability of DC dynamoelectric machines. The extension forms a substantially L-shaped cross section. One of these flux barriers is placed on each side of a commutating pole to intercept a substantial portion of the leakage flux passing from the pole without forming an eddy current path around the pole itself, the flux barrier and the commutating coil being positioned as closely as possible to the armature.

DETAILED DESCRIPTION OF THE DRAWINGS

Figure 1:
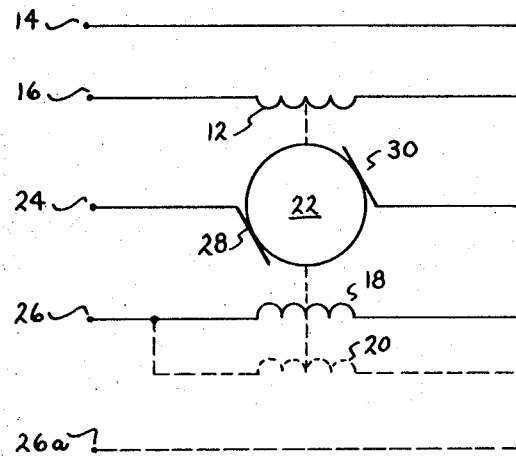
FIG. 1 is an electrical schematic diagram of a DC dynamoelectric machine.

FIG. 1, an electrical, schematic representation of a DC dynamoelectric machine, depicts the major electrical elements of such a machine including the windings which serve as sources of the main field and commutating flux.

Considering first the elements comprising the machine stator, a first winding 12 represents a plurality of main field coils located on magnetic structures in the stator frame. These coils 12 may be connected in series, parallel or series-parallel relationship with each other to suit a potential applied to terminals 14 and 16. The applied potential causes a current to flow in the field winding 12 and creates a main source of magnetic flux in the stator of the machines, these field coils 12 being used alone as a main source of flux in a shunt wound machine.

Second and third windings 18 and 20, respectively, also represent a plurality of coils on magnetic structures in the stator frame. The winding 20 comprises a series field winding which is used in combination with the shunt winding 12 in a compound wound machine or is used alone as a main field flux source in a series wound machine. The main field may also be produced through the use of permanent magnets mounted within the machine.

The second winding 18 comprises a commutating winding, which as explained above, is connected electrically in series with an armature 22 rotatably mounted in the machine stator. The commutating winding attempts to produce commutating flux in proportion to the current in the armature 22 in a magnetic structure about which it is wound. Electrical connections 24 and 26, or 26A if the third winding is incorporated, provide for delivery of power to the armature circuit. Brushes 28 and 30 provide a sliding, conductive current path to the armature 22 of the machine to effect a power transfer from the stationary portions of the armature circuit to the rotatably mounted armature 22.

Figure 2:
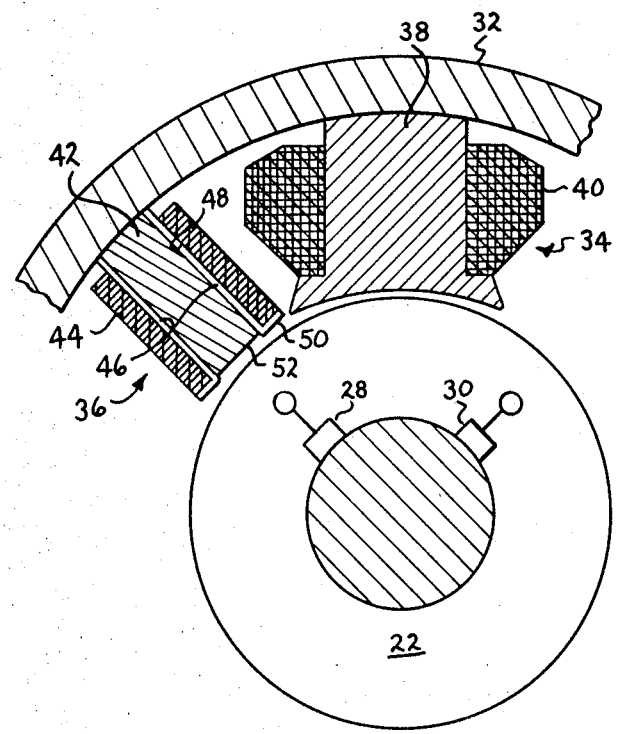
FIG. 2 is a portion of a cross section of a dynamoelectric machine made in accordance with this invention.

FIG. 2, a portion of a cross section of a dynamoelectric machine, shows structural relationships of the major elements of the dynamoelectric machine introduced in the preceeding discussion of FIG. 1 and several nonelectrical elements which are included in a dynamoelectric machine.

A stator frame 32 furnishes a return path for flux produced in main and commutating field assemblies 34 and 36, respectively, and constitutes a physical support for these assemblies. The main field assembly 34 comprises a main pole piece 38 in which flux is developed by a main field coil 40 which is a portion of the windings 12 and/or 20 of FIG. 1, depending on the type of machine which is desired.

The commutating field assembly 36 comprises a commutating pole piece 42, having a coil 44, a portion of the commutating winding 18 of FIG. 1, wound thereabout to develop commutating flux.

In accordance with the principles of this invention, the commutating field assembly 36 further comprises transient leakage flux barriers 46 which are made of highly conductive material, that is material having a low electrical resistivity, and are mounted between the commutating pole piece 42 and the coil 44. The transient flux barrier 46 may comprise any shape or configuration of highly conductive material which allows the transient leakage flux intercepted thereby to generate eddy currents. In a preferred embodiment of this invention, the transient flux barriers 46 comprise sheets of copper material having extensions thereon at the end adjacent the armature. It was found particularly advantageous for these sheets forming the transient flux barriers 46 to have substantially L-shaped cross sections. Each of these transient flux barriers is mounted along one side of a commutating pole piece 42.

While not critical to the broadest aspects of this invention, the length of a longer leg 48 of the L-shaped transient flux barrier and the location of the barrier is such that a shorter leg 50 extends slightly below pole face 52 of the pole piece 42. When the transient flux barriers 46 are mounted as shown in FIG. 2 so as to be as close to the surface of the armature as possible, a substantial amount of the transient leakage flux is intercepted and commutation is optimized. In this configuration, the commutating coil 44 should be mounted against the shorter leg 50 of the transient flux barrier 46 so that the commutating coil is also as close to the armature as is possible. The minimum gap from the surface of the armature to the surface of the transient flux barriers 46 is determined by factors such as the amount of main bearing wear which can be expected during the use of the machine, which wear might cause the armature to rub the surface of the transient flux barriers 46 at the lower commutating poles. The minimum gap is also determined by the ability of the armature insulation to prevent arcing between the armature coils and the transient flux barriers.

Commutation has been further improved during transient load conditions by mounting the transient flux barrier adjacent laminated commutating poles, with the laminations stacked axially with respect to the motor or in a circumferential direction with respect to the motor. These laminations should be insulated from one another to make the laminated commutating pole effective in improving commutation. Commutation is further improved by lengthening the airgap between the commutating pole tip and the surface of the armature and increasing the overcompensation provided by the commutating pole. The eddy currents produced in the magnet frame of the motor are thus a smaller percentage of the overcompensation ampere turns which is effective in producing good commutation of the dynamoelectric machine.

It has been found that some of the material of the transient flux barriers 46 which is near the stator frame 32 can be removed without substantially affecting the performance of the transient flux barriers 46 in improving commutation. In one instance, the material was removed starting at the magnet frame for a distance of about one-fourth to one-third of the length of the commutating pole so that the transient flux barriers 46 extended about two-thirds to three-fourths of the length of the commutating pole.

Figure 3:
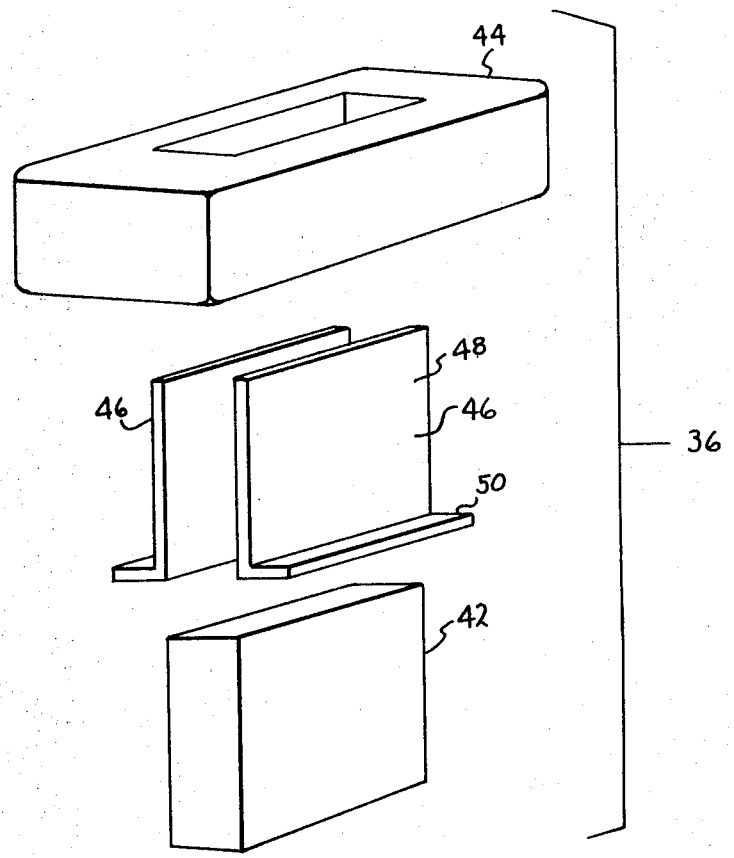
FIG. 3 is an exploded view of a commutating field structure made in accordance with this invention.

FIG. 3 shows an exploded view of the commutating field assembly 36, including a commutating pole piece 42, a commutating coil 44, and the transient leakage flux barriers 46. In this exploded view it can be seen that the transient flux barriers 46 extend for about the full length of the commutating pole piece 42. For any given machine or type of machine, experimentation will be necessary to determine the optimum lengths of the legs 48 and 50.

Figure 4A:
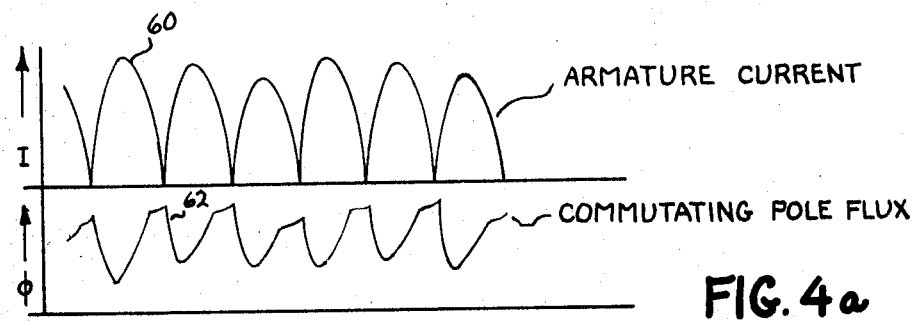
FIG. 4 shows a relationship between the armature current and the commutating flux of a dynamoelectric machine prior to the use of this invention [FIG. 4a] and with the use of this invention [FIG. 4b].

FIG. 4a shows wave diagrams of the current flow through the commutating coil and the effective commutating flux typical of many DC motors without the use of this invention. Note that the peaks of the armature current waves, such as the peak 60, are substantially out of phase with the corresponding peaks of the commutating flux wave, such as peak 62. Thus, the commutating flux is not at a maximum level when it is needed to aid in commutating the maximum level of the armature current. In fact, the commutating flux level is found to be near its minimum value at a time corresponding to the maximum point 60 on the commutating current wave. This is believed to be a primary cause for poor commutation of DC dynamoelectric machines.

The time variations of the commutating pole flux at the airgap has been found to be dependent on the geometry of the machine and on the speed of current changes. Three factors have been found to affect the generation of transient flux in dynamoelectric machines: the commutating field ampere turns, the armature reaction ampere turns, and the generated eddy current ampere turns. In FIG. 4a it is seen that the armature reaction ampere turns appear to predominate in the formation of flux at the airgap of the commutating pole. This is believed to result from the presence of eddy current ampere turns in the commutating pole and magnet frame.

Figure 4B:
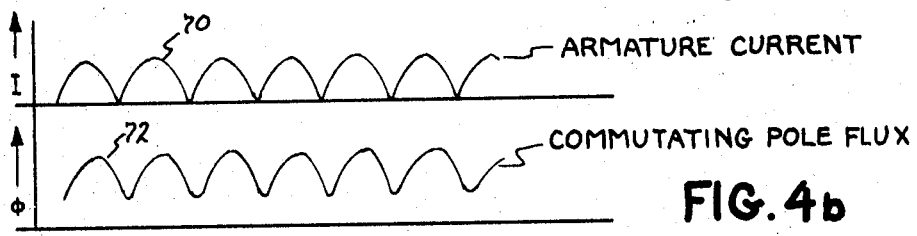

FIG. 4b shows the wave diagrams of the armature current and commutating flux for the same machine as those shown in FIG. 4a, but with the addition of the transient flux barriers 46 of this invention. The scales for the armature current and commutating flux are different in FIGS. 4a and 4b. In comparing the relationship between the peak points of the armature current and the commutating flux, it should be noted that a peak point 70 on the armature current wave diagram is relatively close in time relationship to a point 72, the maximum level of the commutating flux. Upon the use of this invention, the armature current and the commutating flux are no longer substantially out of phase as they were in FIG. 4a. The transient leakage flux has caused eddy currents to be generated in the transient flux barriers 46, these eddy currents opposing changes in the leakage flux and reducing the transient leakage flux in other portions of the magnetic circuit of the dynamoelectric machine. This reduction in turn reduces the distributed eddy currents in the magnetic circuit and allows the effective flux to change more nearly in phase with the change in the armature current.

This invention is not limited to the specific details of the illustrated embodiments, and it is contemplated that many changes, additions and modifications of these embodiments will occur to those skilled in the art. It is, therefore, intended that the appended claims cover all such changes, additions and modifications which fall within the true spirit and scope of this invention.

I claim:

1. In a DC dynamoelectric machine having a stator including an annular stator frame and an armature mounted for rotation within said stator, commutation improvement means for substantially inhibiting changes in transient leakage flux, said commutation improvement means including a plurality of commutating pole assemblies each comprising:

a commutating pole extending radially inwardly from said stator frame toward said armature, a pair of flux barrier elements formed of a nonmagnetic material having a high electrical conductance positioned on circumferentially opposite sides of said commutating pole, each of said flux barrier elements including a first portion abutting at least the radially inner portion of the respective side of said commutating pole and a second portion projecting tangentially away from said commutating pole at the radially inner end of said first portion such that said flux barrier element has a substantially L-shaped cross-sectional configuration, and a commutating coil surrounding said commutating pole and said first portions of said flux barrier elements, said second portions of said flux barrier elements and said commutating coil both being positioned as close to said armature as is reasonably possible.